United States Patent
Horng et al.

(10) Patent No.: US 8,063,595 B2
(45) Date of Patent: Nov. 22, 2011

(54) LOCATION SYSTEM AND METHOD

(75) Inventors: Rong-Hwang Horng, Taipei Hsien (TW); You-Ren Lin, Taipei Hsien (TW); Rong-Cong Hung, Taipei Hsien (TW); Shih-Chang Chen, Taipei Hsien (TW); Shen-An Chen, Taipei Hsien (TW); Yaw-Shen Lai, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 529 days.

(21) Appl. No.: 12/332,360

(22) Filed: Dec. 11, 2008

(65) Prior Publication Data
US 2010/0097022 A1    Apr. 22, 2010

(30) Foreign Application Priority Data
Oct. 16, 2008   (CN) .......................... 2008 1 0304952

(51) Int. Cl.
*H02P 6/16* (2006.01)
(52) U.S. Cl. .............. 318/400.07; 318/400.11
(58) Field of Classification Search ............. 318/400.11, 318/400.12, 400.32, 400.33, 400.34, 400.07
See application file for complete search history.

(56) References Cited

U.S. PATENT DOCUMENTS

| | | | | |
|---|---|---|---|---|
| 4,565,957 A * | 1/1986 | Gary et al. | ..................... | 318/723 |
| 4,876,491 A * | 10/1989 | Squires et al. | ........... | 318/400.33 |
| 5,801,509 A * | 9/1998 | Sawa et al. | ..................... | 318/705 |
| 5,896,019 A * | 4/1999 | Nashiki et al. | ................. | 318/701 |
| 6,107,771 A * | 8/2000 | Maeda | ........................... | 318/630 |
| 6,670,784 B2 * | 12/2003 | Odachi et al. | .................. | 318/700 |
| 7,425,811 B2 * | 9/2008 | Onishi et al. | .................. | 318/569 |
| 2003/0011340 A1 * | 1/2003 | Odachi et al. | .................. | 318/700 |

* cited by examiner

*Primary Examiner* — Bentsu Ro
(74) *Attorney, Agent, or Firm* — Altis Law Group, Inc.

(57) ABSTRACT

A location system is configured for determining a magnetic pole position of a motor. The location system includes a motor driver, a current control module, a current feedback apparatus, a speed feedback apparatus, and a magnetic pole position location module. The current control module is configured for set current of the motor via the motor driver. The current feedback apparatus is configured for sensing an actual current of the motor. The speed feedback apparatus is configured for sensing an actual speed of the motor. The magnetic pole position location module is configured for inputting a magnetic pole position of the motor, receiving the actual current from the current feedback apparatus, receiving the actual speed from the speed feedback apparatus, and processing the actual current and the actual speed to obtain an initial magnetic pole position.

12 Claims, 5 Drawing Sheets

LOCATION SYSTEM AND METHOD

BACKGROUND

1. Technical Field

Embodiments of the present disclosure relate to location systems and location methods, and more particularly to a location system and a location method for determining a magnetic pole position of a motor.

2. Description of the Related Art

A permanent magnetic synchronous motor includes a rotor and a stator which is a permanent magnet. It is necessary to supply an appropriate current to the stator in accordance with the position of a rotor magnetic pole, and hence a rotor magnetic pole position is fundamentally required for driving the permanent magnetic synchronous motor. Generally, operators measure the magnetic pole position of the rotor before starting the permanent magnetic synchronous motor to adjust parameters thereof, to make sure of a smooth start for the permanent magnetic synchronous motor. However, manually measuring the magnetic pole position may be inaccurate.

Therefore, what is needed, is a location system and a location method which can accurately determine a magnetic pole position of a motor.

BRIEF DESCRIPTION OF THE DRAWINGS

FIG. 2-1 and FIG. 2-2 are a flowchart of one embodiment of a location method of the present disclosure.

DETAILED DESCRIPTION

Figure 1:
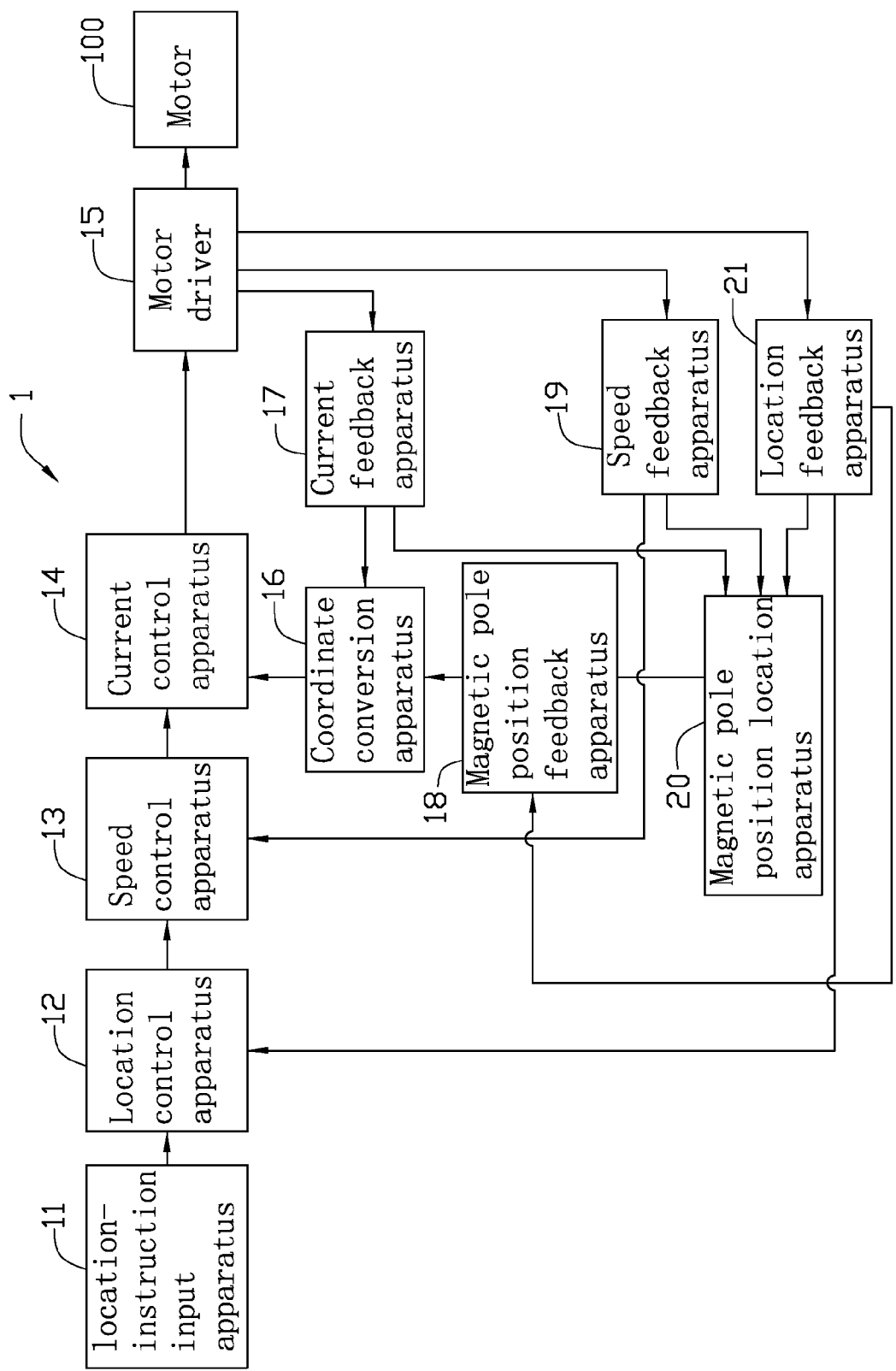
FIG. 1 is a block diagram of one embodiment of a location system of the present disclosure.

Referring to FIG. 1, one embodiment of a location system 1 is configured to determine a magnetic pole position of a motor 100. The location system 1 includes a location-instruction input module 11, a location control module 12, a speed control module 13, a current control module 14, a motor driver 15, a coordinate conversion module 16, a current feedback apparatus 17, a magnetic pole position feedback apparatus 18, a speed feedback apparatus 19, a magnetic pole position location module 20, and a location feedback apparatus 21.

In the present embodiment, the location-instruction input module 11, the location control module 12, the speed control module 13, the current control module 14, the coordinate conversion module 16, and the magnetic pole position location module 20 are set in a computer system, and can be processed by a processor (not shown). The location-instruction input module 11, the location control module 12, the speed control module 13, the current control module 14, and the magnetic pole position location module 20 are configured to output instructions to control the motor 100 via the motor driver 15. The coordinate conversion module 16 includes software to convert a three-phase current to a two-phase current. The current feedback apparatus 17 is a current sensor. The speed feedback apparatus 19 is a motor velocimeter. The magnetic pole position feedback apparatus 18 and the location feedback apparatus 21 are a motor encoder. It may be understood that the motor encoder is a device for giving operators information of a motor's working status. The motor encoder can transform signals of the motor to another signal, and operators can find out the working status of the motor according to the another signal.

The location-instruction input module 11 is connected to a first input of the location control module 12 to output a location-instruction to the location control module 12. An output of the location control module 12 is connected to a first input of the speed control module 13. An output of the speed control module 13 is connected to an input of the current control module 14. An output of the current control module 14 is connected to an input of the motor driver 15. A control terminal of the motor driver 15 is connected to the motor 100 to control working parameters of the motor 100 according to instructions from the location control module 12, the speed control module 13, and the current control module 14.

An input of the current feedback apparatus 17, an input of the speed feedback apparatus 19, and an input of the location feedback apparatus 21 are connected to an output of the motor driver 15 to sense an actual current, an actual speed, and a location of the rotor of the motor 100 correspondingly. An output of the current feedback apparatus 17 is connected to a first input of the coordinate conversion module 16. An output of the speed feedback apparatus 19 is connected to a second input of the speed control module 13 to feedback the actual speed of the motor 100 to the speed control module 13. An output of the location feedback apparatus 21 is connected to a second input of the location control module 12 to feedback the location of the rotor of the motor 100 to the location control module 12. The output of the location feedback apparatus 21 is also connected to the magnetic pole position feedback apparatus 18 to output the location of the rotor of the motor 100 to the magnetic pole position feedback apparatus 18.

The magnetic pole position feedback apparatus 18 is configured to process a magnetic pole position of the motor 100 according to the location of the rotor of the motor 100. An output of the magnetic pole position feedback apparatus 18 is connected to a second input of the coordinate conversion module 16 to output the magnetic pole position of the motor 100 to the coordinate conversion module 16.

The coordinate conversion module 16 is configured to convert the actual current of the motor 100 with three phases from the current feedback apparatus 17 to a first current with two phases via software employing a Park's transformation according to the magnetic pole position of the motor 100 from the magnetic pole position feedback apparatus 18, and output the first current with two phases to the current control module 14. It may be understood that the Park's transformation is a method of decoupling control loops for real power and reactive power in power converters.

The location control module 12 is also configured to compare signals from the location-instruction input module 11 with signals from the location feedback apparatus 21 to generate a speed instruction, and output the speed instruction to the speed control module 13 for controlling the motor 100.

The current control module 14 is configured to set a current of the motor 100, and compare signals from the speed control module 13 with signals from the coordinate conversion module 16 to generate a torque force instruction for controlling the motor 100.

A first input of the magnetic pole position location module 20 is connected to an output of the current feedback apparatus 17, an output of the speed feedback apparatus 19, and an output of the location feedback apparatus 21 to store signals from the current feedback apparatus 17, the speed feedback apparatus 19, and the location feedback apparatus 21. The magnetic pole position location module 20 is configured to process signals from the current feedback apparatus 17, the speed feedback apparatus 19, and the location feedback apparatus 21. A second input of the magnetic pole position location module 20 is connected to the magnetic pole position feedback apparatus 18 to store the magnetic pole position from the magnetic pole position feedback apparatus 18. The magnetic pole position location apparatus 20 is also configured to set magnetic pole position of the motor 100.

Figures 1, 2:
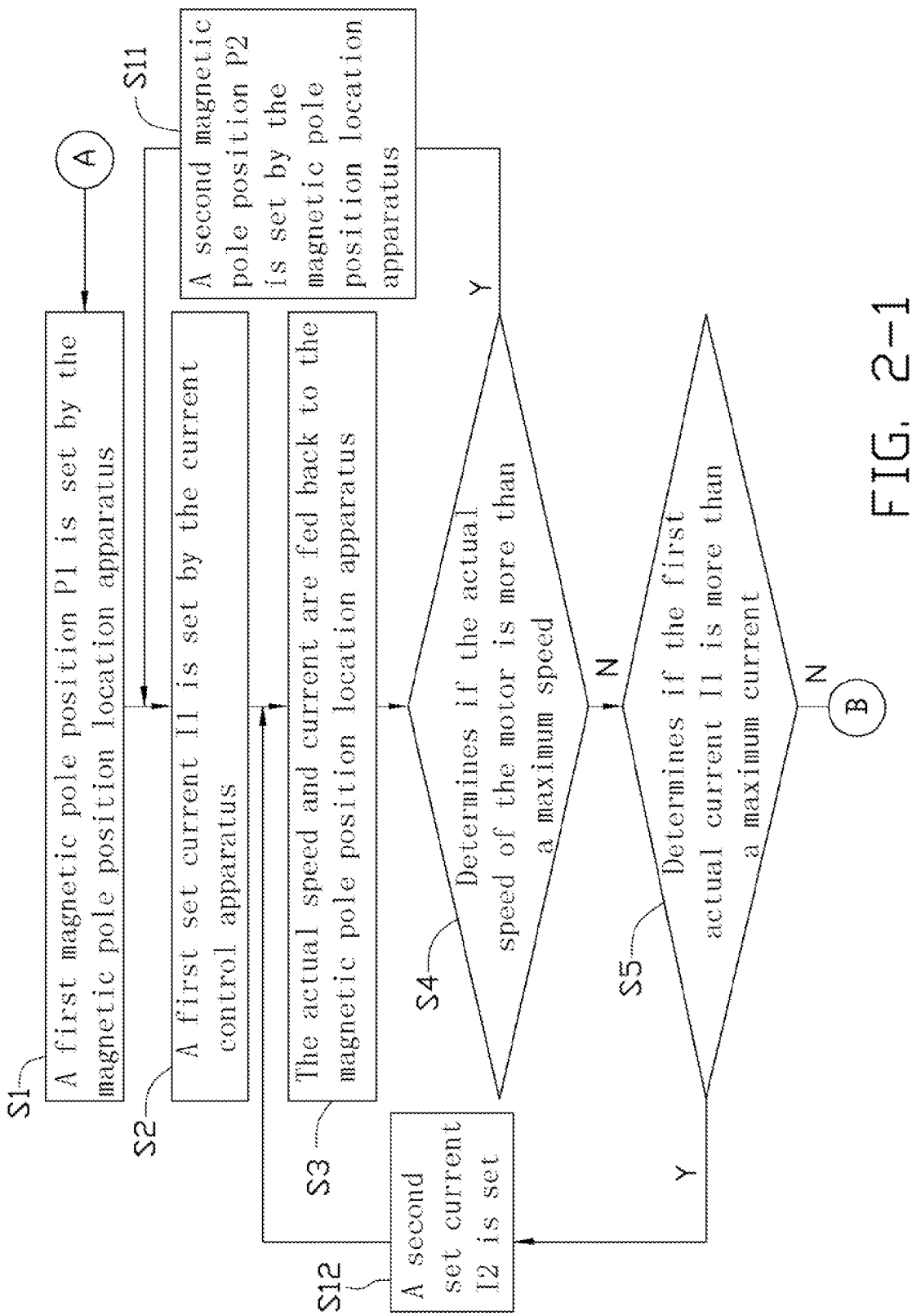
Figure 2:
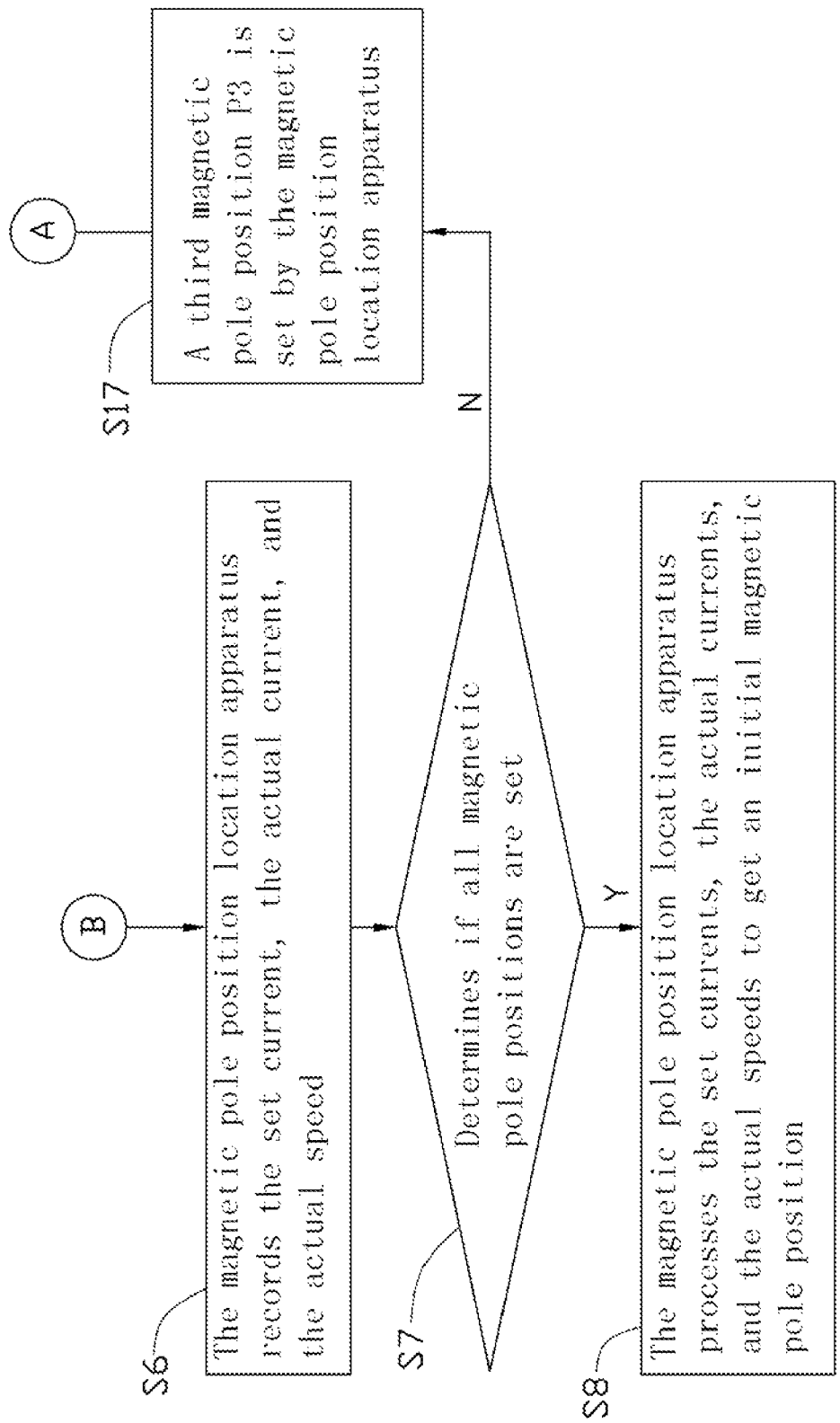

FIG. 2-1 and FIG. 2-2 are a flowchart of one embodiment of a location method of the present disclosure. The method of FIG. 2-1 and FIG. 2-2 may be used to determine a magnetic pole position of the motor 100. Depending on the embodiment, additional blocks may be added, others deleted, and the ordering of the blocks may be changed.

In block S1, a first magnetic pole position P1 of the motor 100 is set by the magnetic pole position location module 20.

In block S2, a first set current I1 of the motor 100 is set by the current control module 14. The motor 100 is started by the motor driver 15.

In block S3, the location feedback apparatus 21 and the speed feedback apparatus 19 feedback the actual speed of the motor 100 to the magnetic pole position location module 20. The current feedback apparatus 17 feedbacks a first actual current of the motor 100 to the magnetic pole position location module 20.

In block S4, the magnetic pole position location module 20 determines if the actual speed of the motor 100 is more than a maximum speed allowed according to specifications of the motor 100. If the actual speed of the motor 100 is more than the maximum speed, the procedure goes to block S11. If the actual speed of the motor 100 is equal to or less than the maximum speed, the procedure goes to block S5.

In block S11, a second magnetic pole position P2 of the motor 100 is set by the magnetic pole position location module 20. The procedure goes to block S2.

In block S5, the magnetic pole position location module 20 determines if the first actual current I1 is more than a maximum current according to the motor 100 specifications. If the first actual current of the motor 100 is more than the maximum current of the motor 100, the procedure goes to block S12. If the first actual current of the motor 100 is equal to or less than the maximum current, the procedure goes to block S6.

In block S12, a second set current I2 of the motor 100 is set by the current control module 14. The procedure goes to block S3.

In block S6, the magnetic pole position location module 20 records the first, second set current I1, I2, the first and a second actual current of the motor 100, and an actual speed of the motor 100.

In block S7, the magnetic pole position location module 20 determines if all magnetic pole positions of the motor 100 are set. If not all the magnetic pole positions of the motor 100 are set, the procedure goes to block S17. If all the magnetic pole positions of the motor 100 are set, the procedure goes to block S8.

In block S17, a third magnetic pole position P3 of the motor 100 is set by the magnetic pole position location module 20. The procedure goes to block S2.

In block S8, a plurality of magnetic pole positions, a plurality of set current values, a plurality of actual current values and a plurality of actual speeds are stored in the magnetic pole position location module 20. For example, when the first magnetic pole position P1 and the first set current I1 is set, the first actual current and the actual speed of the motor 100 are recorded as I11 and V1. When the first magnetic pole position P1 and the second set current I2 are set, the second actual current and the actual speed of the motor 100 are recorded as I12 and V2. When the second magnetic pole position P2 and the first set current I1 are set, a third actual current and the actual speed of the motor 100 are recorded as I21 and V3. When the second magnetic pole position P2 and the second set current I2 are set, a fourth actual current and the actual speed of the motor 100 are recorded as I22 and V4. The first to fourth actual current I11, I12, I21, I22, the actual speed V1, V2, V3 and V4 are stored in the magnetic pole position location module 20. The speed feedback apparatus 19 calculates the set current values, the actual current values, and the actual speed stored in the magnetic pole position location module 20 to obtain an initial magnetic pole position. A reduction in the actual current causes the motor 100 to achieve a greater speed such that the motor 100 being at the initial magnetic pole position causes the motor 100 to achieve a peak actual speed.

Figure 3:
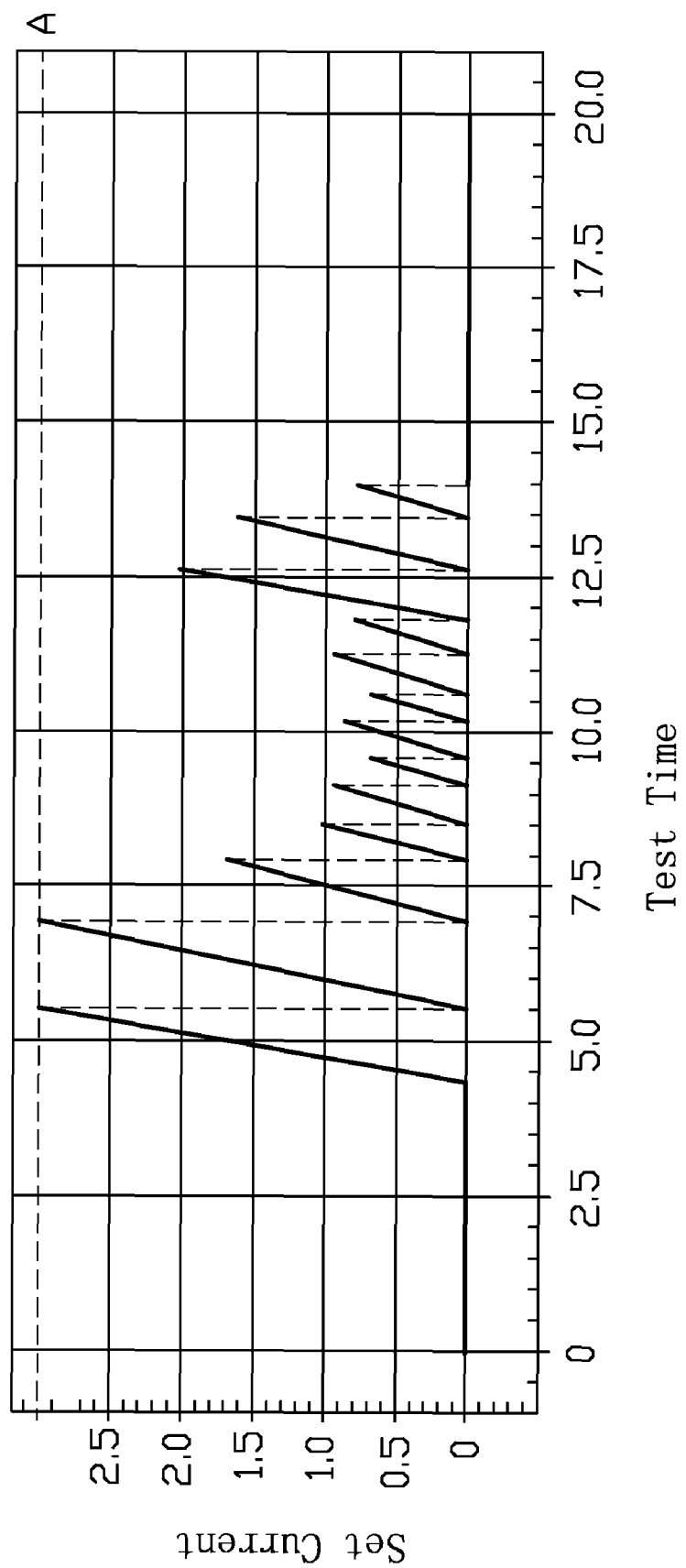
FIG. 3 is one embodiment of a graph of from a simulation of current of a motor of FIG. 1.
Figure 4:
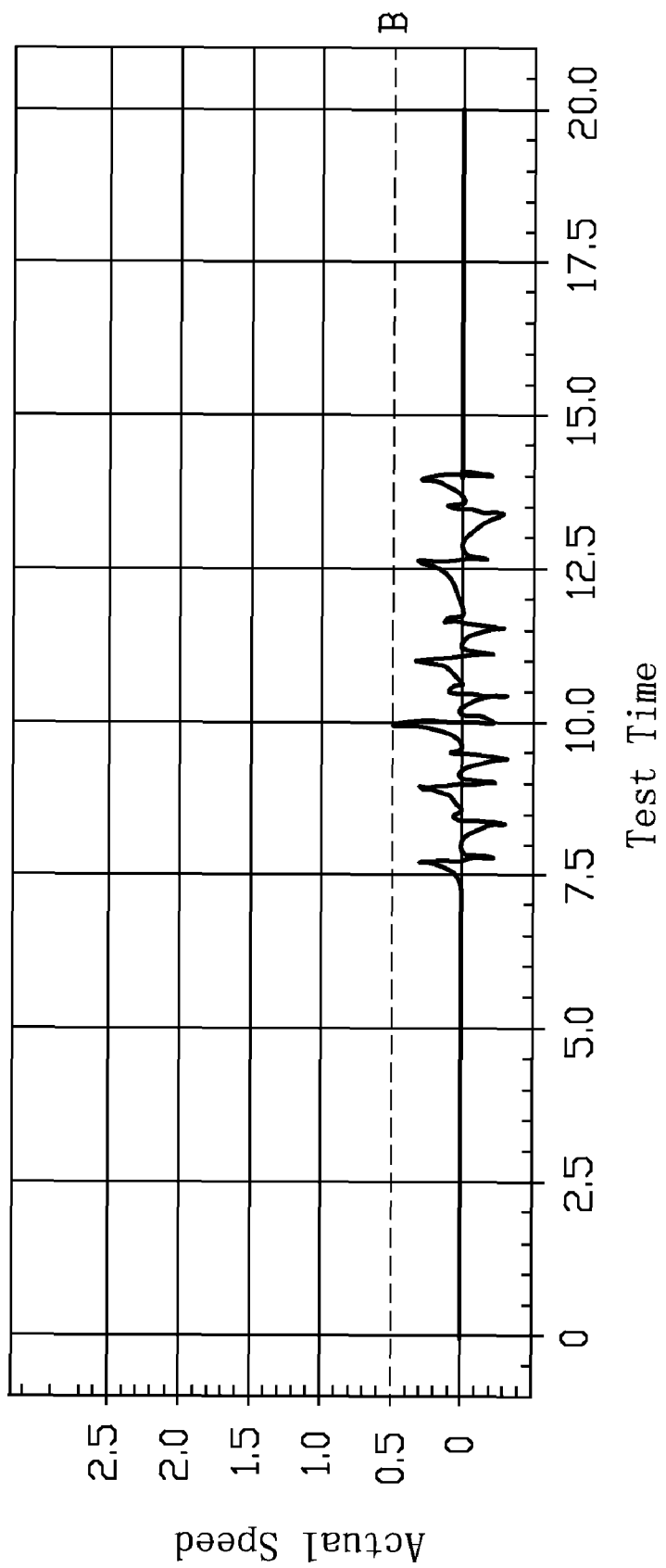
FIG. 4 is one embodiment of a graph of from a simulation of speed of the motor of FIG. 1 according to FIG. 3.

FIG. 3 is one embodiment of a graph of from a simulation of current of the motor 100 of FIG. 1. In FIG. 3, a y-axis denotes a set current of the motor 100, and an x-axis denotes a test time of the location system 1 of FIG. 1. A broken line "A" denotes the maximum current of the motor 100 over the test time. FIG. 4 is one embodiment of a graph of a simulation of speed of the motor of FIG. 1 according to FIG. 3. In FIG. 4, a y-axis denotes an actual speed of the motor 100, and an x-axis denotes the test time of the location system 1. A broken line "B" denotes the maximum speed of the motor 100 over the test time.

According to FIG. 3 and FIG. 4, when the test time is 10 ms, the actual current of the motor and the actual speed of the motor 100 achieve a high-point. In other words, when the test time is 10 ms, the motor 100 achieves greatest speed with lowest set current. As a result, when the test time is 10 ms, the magnetic pole position of the motor 100 is the initial magnetic pole position of the motor 100.

The foregoing description of the various inventive embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the disclosure and their practical application so as to enable others of ordinary skill in the art to utilize the disclosure and various embodiments and with various modifications as are suited to the particular use contemplated. Alternately embodiments will become apparent to those of ordinary skill in the art to which the present disclosure pertains without departing from its spirit and scope. Accordingly, the scope of the present disclosure is defined by the appended claims rather than the foregoing description and the various inventive embodiments described therein.

What is claimed is:

1. A location system configured to determine an initial magnetic pole position of a motor, the location system comprising:
   a motor driver;
   a current control module configured for setting current of the motor via the motor driver;
   a current feedback apparatus configured for detecting an actual current of the motor;
   a speed feedback apparatus configured for detecting an actual speed of the motor;
   a location feedback apparatus configured for detecting a location of a rotor of the motor;
   a magnetic pole position feedback apparatus configured for processing a magnetic pole position of the motor; and a magnetic pole position location module configured for setting a magnetic pole position of the motor, receiving the actual current from the current feedback apparatus, receiving the actual speed from the speed feedback apparatus, receiving the location of the rotor of the motor from the location feedback apparatus, and processing the actual current and the actual speed to obtain an initial magnetic pole position, wherein a reduction in the actual current causes the motor to achieve a greater speed such that the motor being at the initial magnetic pole position causes the motor to achieve a peak actual speed.

2. The location system of claim 1, further comprising a coordinate conversion module, wherein the coordinate conversion module includes a Park's Transformation program to convert a three-phase current of the motor from the current feedback apparatus to a two-phase current, and transmit the two-phase current to the current control module.

3. The location system of claim 1, wherein the speed feedback apparatus is a motor velocimeter.

4. The location system of claim 1, wherein the current feedback apparatus is a current sensor.

5. The location system of claim 1, wherein the magnetic pole position feedback apparatus is a motor encoder.

6. The location system of claim 1, wherein the location feedback apparatus is a motor encoder.

7. A location method for determining an initial magnetic pole position of a motor, the location method comprising:
   (a) setting a first magnetic pole position of the motor into a magnetic pole position location module;
   (b) setting a first current of the motor by a current control module;
   (c) sensing an actual speed of the motor by a speed feedback apparatus, a location of a rotor of the motor by a location feedback apparatus, and an actual current of the motor by a current feedback apparatus;
   (d) feedbacking the actual speed and the actual current to the magnetic pole position location module, and feedbacking the location of the rotor of the motor to a magnetic pole position feedback apparatus;
   (e) determining if the actual speed of the motor is more than a maximum speed of the motor by the magnetic pole position location module;
   (f) setting a second magnetic pole position of the motor by the magnetic pole position location module in response that the actual speed of the motor being more than the maximum speed of the motor, and return to step (b);
   (g) determining if the actual current of the motor is more than a maximum current of the motor in response that the actual speed being less than or equal to the maximum speed of the motor;
   (h) setting a second current of the motor by the current control module in response that the actual current of the motor being more than the maximum current of the motor, and return to step (c);
   (i) recording the first current, the actual current, and the actual speed of the motor by the magnetic pole position location module in response that the actual current of the motor being less than or equal to the maximum current of the motor;
   (j) determining if all of magnetic pole positions of the motor have been inputted by the magnetic pole position location module;
   (k) setting a third magnetic pole position of the motor into the magnetic pole position location module in response that all of magnetic pole positions of the motor being not set, and return to step (b); and
   (l) processing and comparing a plurality of magnetic pole positions, current, actual current, and actual speed of the motor to obtain an initial magnetic pole position of the motor in response that all of the magnetic pole positions being set, wherein a reduction in the actual current causes the motor to achieve a greater speed such that the motor being at the initial magnetic pole position causes the motor to achieve a peak actual speed.

8. The location method of claim 7, wherein before step (d) comprises:
   a three-phase current of the motor from the current feedback apparatus is converted to a two-phase current with a coordinate conversion module, wherein the coordinate conversion module includes a Park's Transformation program to convert the three-phase current to the two-phase current.

9. The location method of claim 7, wherein the speed feedback apparatus is a motor velocimeter.

10. The location method of claim 7, wherein the current feedback apparatus is a current sensor.

11. The location system of claim 7, wherein the magnetic pole position feedback apparatus is a motor encoder.

12. The location system of claim 7, wherein the location feedback apparatus is a motor encoder.

* * * * *